Aug. 9, 1932.  O. A. ROSS  1,870,823
MUSICAL DIRECTING APPARATUS
Filed March 4, 1927
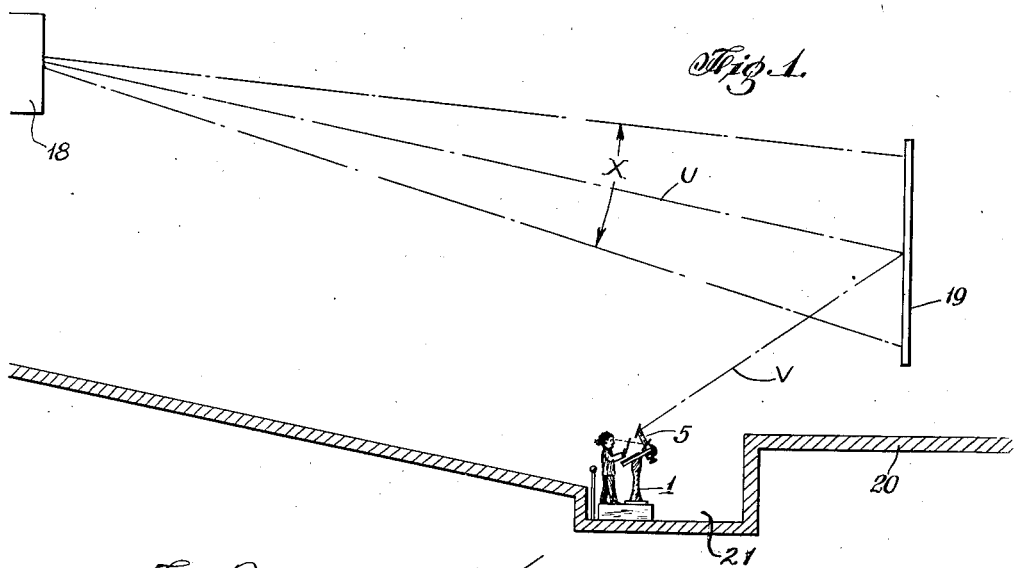
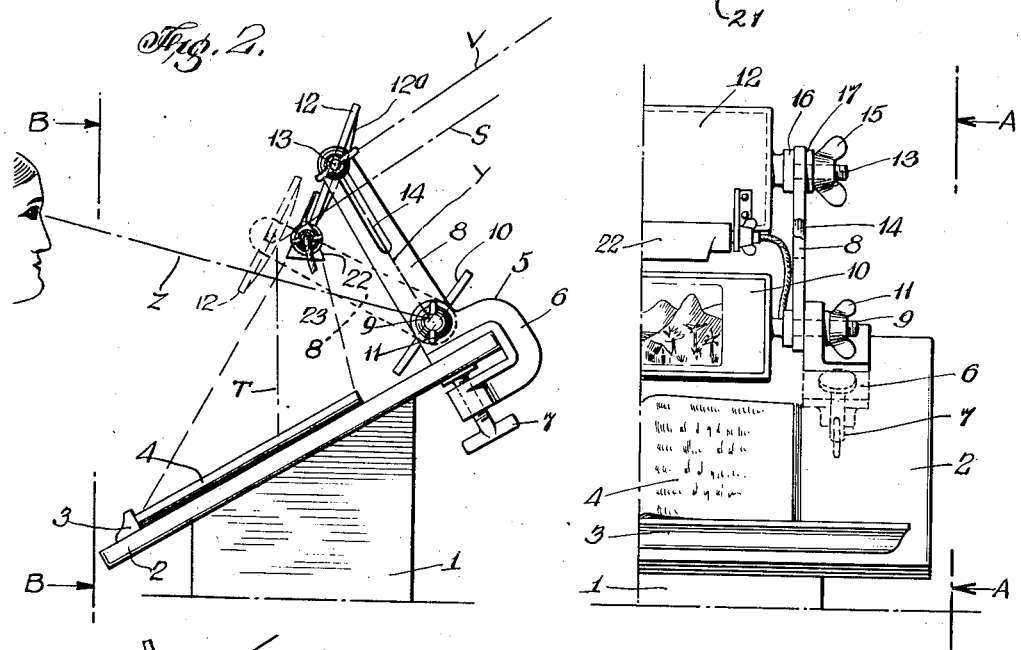
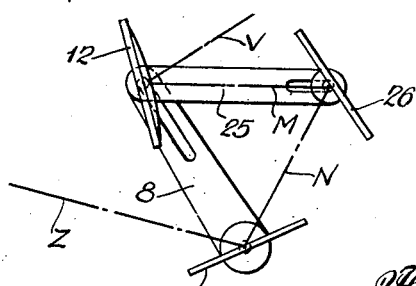
INVENTOR
Oscar A. Ross.

Patented Aug. 9, 1932

1,870,823

UNITED STATES PATENT OFFICE

OSCAR A. ROSS, OF NEW YORK, N. Y.

MUSICAL DIRECTING APPARATUS

Application filed March 4, 1927. Serial No. 172,757.

This invention refers to musical directing apparatus for furnishing clues to directors, or musicians in moton picture theaters or other places of amusement.

It is well known that in motion picture houses most of the orchestra pits and conducting stands for the musical directors are placed directly in front of, and considerably below the lower edge of the motion picture screen making it necessary for the musical director or solo musician to continually look upward at an awkward angle in order to obtain a cue for change of music to comply with change of scene on the screen.

One object of this invention is to furnish an apparatus which will reproduce in miniature form, all scenes on a screen, or acts on a stage, directly in front of the musical director, or musician whereby he will receive cues for changing the music without the necessity of taking his vision from the musical score, or assuming a strained position of the body.

Another object is to furnish a musical directing apparatus which will permit of adjustment of the various parts to conform to varying distances between location of musical directors' stands and motion picture screens in various houses whereby the scene projected on the screen may be reprojected in true but reduced form directly before the vision of the musical director as he is viewing the musical score on his stand, such adjustment being permitted within a large variation of horizontal and vertical latitudes.

Other objects and advantages will appear as the description of the invention progresses, and the novel features of the invention will be pointed out in the appended claims.

This invention consists of the novel construction and arrangement of parts hereinafter described, delineated in the accompanying drawing, and particularly pointed out in that portion of the instrument wherein patentable novelty is claimed for certain and peculiar features of the device, it being understood that, within the scope of what hereinafter thus is claimed, divers changes in the form proportions, size and minor details of the structure may be made without departing from the spirit of, or sacrificing any of the details of the invention.

In describing the invention in detail, reference is had to the accompanying drawing wherein I have illustrated embodiments of my invention and wherein like characters of reference designate corresponding parts throughout the several views, and in which:—

Figure 1 is a part sectional view of a motion picture theater showing the application of the improved musical directing apparatus, and, Fig. 2 is a side elevation of the apparatus shown as clamped to a musical director's stand and is taken on line A—A of Fig. 3, and Fig. 3 is a front elevation of one half of the same apparatus and is taken on line B—B of Fig. 2, and Fig. 4, is a modified form of the apparatus shown in Figs. 2 and 3. It is to be understood that the left hand portion of the stand 1 which the director normally faces is to be considered the front thereof and the portion supporting brackets 6—6, or right hand portion is to be considered the rear thereof.

To musical director's stand 1, is secured the usual top 2 with music score stop 3 supporting music score 4.

To top 2 is secured the improved apparatus 5 comprising a pair of clamp members 6—6, secured by screws 7—7 and pivotally secured to which are the lower ends of standards 8—8, the studs 9—9 of mirror 10, and wing nuts 11—11 serving to lock standards 8—8 securely to clamp members 6—6 after adjustment.

Pivotally and slidably secured to the upper ends of standards 8—8 is the mirror member 12 having studs 13—13 passing through slot 14, nuts 15—15 and washers 16—16 and 17—17 serving to lock mirror 12 securely to standards 8—8 after adjustment.

Pivotally attached to mirror 12 is lamp casing 22 containing a lamp, the rays of which emanate from opening 23 and illuminate the music score 4.

The operation of the improved apparatus is as follows; referring to Fig. 1 from projection room 18 a scene is projected onto screen 19 located on stage 20, the angle X representing projected area, and the line U the center line of the projected area.

In the orchestra pit 21 is the musical director's stand 1, having the improved musical directing apparatus 5 attached thereto. With the center line of projection U as shown and the relation of the vertical and horizontal distances between the musical director's stand 1, and the screen 19 as shown in Fig. 1, the mirrors 10 and 12 are adjusted substantially as shown in Figs. 2 and 3, the center line of projection being represented by the lines U, V and Y terminating at the eyes of the musical director via line Z. On mirror 10 he will see a reproduced image of the scene on screen 19 in reduced size, and as this mirror is directly above the musical score this reduced size image will be constantly before his sight without necessity of removing his eyes from the score.

If desired the musical score 4 may be removed and a plane mirror substituted therefor, the center line of projection being lines S and T. Such an occasion may arise if the musical director has memorized all of his music. The reduced image may also be projected directly onto the musical score.

The mirror member 12 supports a lens mirror 12a preferably of the condensing type whereby necessarily close approximation of the directing apparatus 5 to screen 19 will permit the entire image projected onto the screen to be reprojected onto mirror 12 and thence to mirror 10.

If the screen 19 is unusually close to the director in a horizontal plane, a third mirror as 26 may be adjustably secured by links 25—25 to the upper ends of standards 8—8 as shown in Fig. 4, and in which case the washers 17—17 are omitted. The addition of mirror 26 reduces the obliqueness of the angle at which the scene is received from screen 19 through line V, thereby reducing to a minimum any distortion of the reproduced image on mirror 10 from mirror 12. The reflected axis when employing the additional mirror 26, is lines V, M, N, and Z as shown in Fig. 4.

Whereas the applicant's musical directing apparatus has been shown as associated with a motion picture theater, said apparatus may also be associated with motion picture recording studios wherein sound motion pictures are recorded, and particularly where the sound is synchronized with the pictures after said pictures have been recorded.

What I claim is:—

1. In combination with a motion picture screen arranged to have motion pictures projected thereonto and a musical director's stand arranged to support a musical score thereon and positioned forwardly of the screen, of a musical directing apparatus comprising; spaced clamping members arranged to be clampably secured to the stand, means supported thereby for clamping the members to the stand in spaced relation, a primary reflecting mirror, a secondary reflecting mirror, supporting members supported by each clamping member for supporting the mirrors therebetween in reflective relation to each other, means supported by the mirror supporting members for adjustably positioning the primary mirror whereby the image depicted onto the screen by the motion picture projector will be reflected onto the reflecting surface of the secondary mirror, and means jointly supported by the mirror supporting members and the clamping members for adjustably positioning the secondary mirror whereby the image received thereby from the primary mirror will be directed into the vision of a musical director normally positioned to view the musical score supported by the stand.

2. In combination with a motion picture screen arranged to have motion pictures projected thereonto and a musical director's stand arranged to support a musical score thereon positioned forwardly of the screen, of a musical directing apparatus comprising; spaced clamping members arranged to be secured to the stand, means supported thereby for clamping the members to the stand, a primary reflecting mirror, a secondary reflecting mirror, supporting members supported by each clamping member for supporting the mirrors therebetween in reflective relation to each other, means supported by the mirror supporting members for clampably pivotally positioning the primary mirror with respect to the mirror supporting members whereby the image depicted on the screen will be reflected onto the reflecting surface of the secondary mirror, and means pivotally joining the clamping members and the mirror supporting members for clampably pivotally positioning the secondary mirror with respect to the mirror supporting members, whereby the image received thereby from the primary mirror will be directed into the vision of a musical director normally viewing the musical score supported by the stand.

3. The combination with a motion picture screen arranged to have a motion picture projected thereonto and a musical directing station positioned forwardly thereof, of a musical directing apparatus comprising, a primary mirror member arranged to receive the image depicted by the screen, a secondary mirror member arranged to receive the image depicted on the primary member, means rigidly secured to the station for adjustably supporting the members in spaced reflective relation thereabove and rearwardly thereof, and optical means supported by one of the mirrors positioned in the path of the light rays for optically reducing the size of the screen image to a predetermined size as depicted on the other mirror irrespective of the distance between the station and the screen.

4. In combination with a motion picture projected onto a screen and a musical directing station positioned forwardly thereof arranged to support a musical score thereon, of a musical directing apparatus comprising, a primary mirror member arranged to receive the image depicted by the screen, a secondary mirror member arranged to receive the image depicted by the primary member, means rigidly secured to the station for supporting the mirrors in adjustable reflective relation above the upper edge of the musical score whereby the image on the secondary member may be readily viewed by a director normally positioned before the station, an illuminating unit adjustably supported by the apparatus having a light source surrounded by an opaque housing, and an orifice formed in the housing positioned to project a beam of light onto the score to the exclusion of the mirrors whereby the image depicted on the secondary mirror may be readily discerned by the director.

5. In combination with a motion picture projected onto a screen and a musical directing station positioned forwardly thereof arranged to support a musical score thereon, of a musical directing apparatus comprising, a primary mirror member arranged to receive the image depicted by the screen, a secondary mirror member arranged to receive the image depicted by the primary member, means rigidly secured to the station for supporting the members in adjustable reflective relation above the upper edge of the musical score whereby the image depicted on the secondary member may be readily discerned by a director normally positioned before the station, an illuminating unit adjustably supported by the primary member having a light source surrounded by an opaque housing, and an orifice formed in the housing positioned to project a beam of light onto the score to the exclusion of the mirrors whereby the image depicted by the secondary member may be readily discerned by the director while viewing the score.

6. In combination with a motion picture projected onto a screen and a musical directing station positioned forwardly thereof, of a musical directing apparatus comprising, a primary mirror member arranged to receive the image depicted by the screen, a secondary mirror member arranged to receive the image depicted by the primary member, means rigidly secured to the station for adjustably supporting the members in spaced reflective relation thereabove and adjacent the rear edge thereof whereby the image depicted by the secondary member may be viewed by a director normally positioned before the station, and optical means supported by the primary mirror member positioned in the path of the light rays for optically reducing the size of the screen image to a predetermined size as depicted on the secondary mirror member irrespective of the distance between the station and the screen.

7. In combination with a motion picture projected onto a screen and a musical directing station positioned forwardly thereof, of light directing apparatus supported thereabove and adjacent the rear edge thereof arranged to reflect a reduced size image depicted by the screen onto a predetermined area of the station, and means supported by the station for selectively supporting a musical score or a mirror within the area whereby a director normally positioned before the station may view the motion picture exhibition without looking at the screen.

8. Musical directing apparatus arranged to be secured to a musical director's stand positioned forwardly of a motion picture screen comprising, a primary mirror arranged to receive the motion pictures depicted by the screen, a secondary mirror arranged to receive the image of the motion pictures depicted by the primary mirror, means rigidly secured to the stand for pivotally supporting the secondary mirror to rotate on a fixed axis, the supporting means being arranged to prevent bodily movement of the secondary mirror with respect to the apparatus, and means supported by the supporting means for supporting the primary mirror for pivotal movement and bodily movement with respect to the secondary mirror.

9. Musical directing apparatus arranged to be secured to a musical director's stand positioned forwardly of a motion picture screen comprising, a primary mirror arranged to receive the motion pictures depicted on the screen, a secondary mirror arranged to receive the image of the pictures depicted by the primary mirror, means rigidly secured to the stand for pivotally supporting the secondary mirror to rotate on a fixed axis, the rotative movement of the secondary mirror forming the sole movement thereof, and means supported by the supporting means for pivotally supporting the primary mirror in spaced relation to the secondary mirror, the supporting means also being arranged to move the primary mirror bodily in an arc of a circle around the axis of rotation of the secondary mirror.

10. Musical directing apparatus arranged to be secured to a musical director's stand positioned forwardly of a motion picture screen comprising, a primary mirror arranged to receive the motion pictures depicted by the screen, a secondary mirror arranged to receive the image depicted by the primary mirror, means rigidly secured to the stand for clampably pivotally supporting the secondary mirror to rotate on a fixed axis, the supporting means being arranged to prevent bodily movement of the secondary mirror with respect to the apparatus, and means clampably supported by the supporting means for clampably supporting the primary mirror for pivotal movement and bodily movement with respect to the secondary mirror.

11. Musical directing apparatus arranged to be secured to a musical director's stand positioned forwardly of a motion picture screen comprising, a primary mirror arranged to receive the motion pictures depicted by the screen, a secondary mirror arranged to receive the picture image depicted by the primary mirror, means rigidly secured to the stand for clampably pivotally supporting the secondary mirror to rotate on a fixed axis, the rotative movement of the secondary mirror forming the sole movement thereof, and means supported by the supporting means for clampably pivotally supporting the primary mirror in spaced relation to the secondary mirror, the supporting means being also arranged to move the primary mirror bodily in an arc of a circle around the axis of the secondary mirror, the secondary mirror clamping means being arranged to clampably position the primary mirror supporting means with respect to the secondary supporting means for positioning the primary mirror at predetermined points on the arc of the circle.

12. Musical directing apparatus arranged to be secured to a musical director's stand positioned forwardly of a motion picture screen comprising, a primary mirror arranged to receive the pictures depicted by the screen, a secondary mirror arranged to receive the image of the picture depicted by the primary mirror, means rigidly secured to the stand for pivotally supporting the secondary mirror to rotate on a fixed axis, the rotative movement of the secondary mirror forming the sole movement thereof, and spacing members arranged to pivotally support the primary mirror adjacent one end thereof, the other end of the spacing members being pivotally supported to rotate on the axis of rotation of the secondary mirror.

13. Musical directing apparatus arranged to be secured to a musical director's stand positioned forwardly of a motion picture screen comprising, a primary mirror arranged to receive the motion pictures depicted by the screen, a secondary mirror arranged to receive the image of the pictures depicted by the primary mirror, means rigidly secured to the stand for pivotally supporting the secondary mirror to rotate on a fixed axis, the rotative movement of the secondary mirror forming the sole movement thereof, spacing members arranged to pivotally support the primary mirror adjacent one end thereof, the other ends of the spacing members being pivotally supported to rotate on the axis of rotation of the secondary mirror, and means supported by the spacing members for bodily moving the primary mirror between the ends thereof for varying the space formed between the mirrors.

14. Musical directing apparatus arranged to be secured to a musical director's stand positioned forwardly of a motion picture screen comprising, a primary mirror arranged to receive the motion pictures depicted by the screen, a secondary mirror arranged to receive the image of the pictures depicted by the primary mirror, means rigidly secured to the stand for pivotally supporting the secondary mirror to rotate on a fixed axis, the rotative movement of the secondary mirror being the sole movement thereof, spacing members arranged to pivotally support the primary mirror adjacent one end thereof, the other ends of the spacing members being pivotally supported to rotate on the axis of rotation of the secondary mirror, and clamping means associated with the secondary mirror for clampably securing the spacing members and the secondary mirror against movement thereof.

Signed at New York city, in the county of New York, and State of New York, this 25th day of February, A. D. 1927.

OSCAR A. ROSS.